Patented June 6, 1950

2,510,839

UNITED STATES PATENT OFFICE 2,510,839

HERBICIDAL COMPOSITION

Albert J. Shmidl, Houston, Tex., assignor, by mesne assignments, to Standard Oil Development Company, Elizabeth, N. J., a corporation of Delaware No Drawing. Application December 15, 1947, Serial No. 791,944

2 Claims. (Cl. 167—45)

The present invention is directed to an improved composition suitable for treating various materials. More particularly, the composition is directed to a carrying agent suitable for use with various herbicides, fungicides, insecticides, and the like.

It has been known to employ 2,4-dichlorophenoxyacetic acid as a herbicide to kill plants which are detrimental to the growth of certain types of vegetation. This material has been used in aqueous solutions as a spray for farm lands and has been particularly advantageous in freeing rice fields of detrimental growth of weeds and the like. It has also been known to use copper naphthenates and other related materials as fungicides for killing undesirable types of fungus growths.

In many cases the compositions which contain certain economic poisons of this type have not been entirely satisafactory for treating plant growth and the like which is constantly exposed to rain or dew. For example, if 2,4-dichlorophenoxyacetic acid is applied to plant life and immediately following the application a heavy rain occurs, a substantial portion of the herbicide is washed from the plants and no beneficial effects are realized. This is particularly true when such materials are applied to plants having waxy leaves which are difficult to wet by the aqueous solutions. Another disadvantage encountered in employing many of the compositions containing economic poisons is that such poisons are very corrosive to containers which have been used to transport them. This difficulty has presented a problem to manufacturers and transporters of the compositions since the easily available types of containers have been, in many cases, rendered useless by prolonged contact with the material. It would, therefore, be very desirable to have available a carrying agent for various types of economic poisons which would prevent excessive corrosion of metallic containers, which would thoroughly wet the material to be contacted such that the poison can take effect, and which would act as a binding agent for prolonging the contact time between the poison and the material being treated.

It is, therefore, the main object of the present invention to provide an improved carrying agent having excellent foaming and spreading qualities which may be used in solution with various types of economic poisons.

Another object of the present invention is to provide a composition of matter including an economic poison and a carrying agent including a material which will inhibit the corrosion of metallic containers.

A further object of the present invention is to provide a composition which includes an economic poison and a material which will act as a wetting and binding agent for the poison.

I have discovered that a carrying agent meeting the above requirements may be obtained by admixing in certain critical proportions an organic oxygen-containing solvent, a corrosion inhibitor, a wetting agent, and a hydrocarbon binding agent. This carrying medium may suitably be employed in admixture with herbicides such as 2,4-dichlorophenoxyacetic acid or one of its esters, copper naphthenates, and other types of economic poisons. This carrying agent when admixed with corrosive types of economic poisons will not corrode to any appreciable extent the usual types of containers employed for transporting such materials. Furthermore, the resilient mixture is not easily removed by contact with water from the surfaces to which it has been applied.

The carrying agent for the economic poison comprises an organic oxygen-containing solvent in a range between about 40% to 95% by weight of the total solution, a corrosion inhibitor such as the sulfonate of a hydroaromatic amine in a range between about 1% to 20% by weight, petroleum alkali metal sulfonates in the range between about 2 and 20% by weight, and a petroleum oil boiling in the lubricating oil boiling range in a range between about 1% and 25% by weight. A highly viscous hydrocarbon binding agent may be added in amounts of from 1 to 10% by weight. The carrying agent may also contain water if desired. To the above base stock may be added sufficient economic poison to produce a concentrate containing from about 10% to 90% by weight of poison based on the total solution.

The solvent suitable for use in the composition may be preferably one of the lower boiling organic oxygen-containing compounds such as the aliphatic alcohols including methyl, ethyl, propyl, isopropyl, butyl, and amyl alcohols. The glycols such as ethylene glycol and propylene glycol may also be employed. Various ketones such as acetone or methyl-ethyl ketone or one of the low molecular weight ethers such as dimethyl ether or methyl-ethyl ether and the like are also satisfactory. It is usually preferable to employ an organic solvent having from about 3 to 4 carbon atoms; however, compounds having as many as 5 carbon atoms may be used under certain conditions.

The corrosion inhibitor most satisfactorily employed is a sulfonate of a hydroaromatic amine which is prepared by neutralizing sulfonic acids, produced by sulfonating aromatic extracts of petroleum boiling in the lubricating oil boiling range, with a hydroaromatic amine such as cyclohexylamine. The sulfonic acids are preferably the oil-soluble sulfonic acids rather than the predominantly acid-soluble sulfonic acids; the latter are usually found in the sulfuric acid layer resulting from the acid treatment of petroleum fractions. The amount of inhibitor in the base stock should generally be somewhat less, on a weight per cent basis, than the amount of wetting agent and viscous oil added. Excessive amounts of the hydroaromatic amine sulfonate tend to impair the foaming and spreading qualities of the composition.

The wetting agent to be employed in the composition may comprise an alkali metal salt of petroleum sulfonic acids. The petroleum sulfonic acids are preferably formed by treating an aromatic extract of petroleum lubricating oil fractions with strong sulfuric acid. The oil layer resulting from the treatment, which contains the oil soluble sulfonic acids, is then treated with an alkali metal hydroxide such as sodium or potassium hydroxides to form the desired alkali metal sulfonates. Excessive amounts of wetting agent should not be employed or the composition will not have the proper adhesive properties.

The binding agent employed in the base stock may comprise preferably a viscous hydrocarbon oil boiling in the lubricating oil boiling range. Those having a Saybolt Universal viscosity at 100° F. of between 60 and 120 seconds may be employed but I have found that the more viscous the binding agent, the more effective it is in the composition. For this reason, it is preferable to employ the predominantly aromatic-type hydrocarbons as opposed to the predominantly-paraffinic type hydrocarbons. Excellent binding agents are obtained by extracting Coastal-type petroleum fractions boiling in the lubricating oil boiling range with phenol, furfural, or other selective solvents, removing solvent from the extract and employing this extract as the binding agent. Such extracts having Saybolt Universal viscosities at 100° F. of from 1000 to 4000 make excellent binding agents. As a general rule, hydrocarbons having Saybolt Universal viscosities at 100° F. of from about 60 to 4000 may be employed. Not more than about 10 weight percent of the highly viscous oils should be employed in the base stock, but up to 25 percent by weight of the lower viscosity hydrocarbons can be used satisfactorily. Mixtures of high and low viscosity oils are eminently suitable in some cases.

The economic poisons which may be added to the base stock comprise a number of different types of compounds which are effective as herbicides, fungicides, insecticides, and the like. 2,4-dimethylphenoxyacetic acid is particularly useful; however, the solubility of this material in the base stock is limited. Usually, when employing a base stock comprising a major portion of an organic oxygen-containing compound, it is not possible to dissolve more than about 60 weight percent of this material in the total mixture. The aliphatic esters of 2,4-dichlorophenoxyacetic acid are not only more effective herbicides than the parent compound but also they are more soluble in the base stock. It is possible to obtain a total composition containing as high as 90 to 95 weight percent of the esters if it is desired to produce a concentrate containing substantial portions of the herbicide. Such esters comprise the ethyl, propyl, isopropyl, or various butyl esters of 2,4-dichlorophenoxyacetic acid. Such an ester may be prepared by reacting any of the low molecular weight aliphatic alcohols with the acid in the presence of a suitable catalyst. The isopropyl ester of 2,4-dichlorophenoxyacetic acid is a very powerful herbicidal agent and is quite soluble in the carrying agent prepared in accordance with the present invention.

As previously mentioned, economic poisons having either herbicidal and/or fungicidal properties may be employed. Such economic poisons include the carbamic derivatives such as the zinc salt of dimethyl-dithiocarbamate, the salicyclic aldehyde derivatives, copper naphthenates, tetrachloro benzoquinone, and the like. Insecticides such as the chlorinated dicyclopentadiene derivatives are compatible with the present base stock. Such poisons will be added to the carrying agent in amounts that are compatible therewith insofar as solubility is concerned. The concentration of any of the economic poisons in the carrying agent will depend not only on its solubility but also on the type of application that is contemplated.

In order to illustrate further the practical applications of the present invention, the following examples will be given. In one series of tests a base stock was prepared which contained 50% isopropyl alcohol, 22% of petroleum sodium sulfonates, 15% of cyclohexylamine sulfonate, and 13% of viscous petroleum oil. The corrosion rates of tin and steel were then determined by partially submerging portions of the metal in the base stock under atmospheric conditions of temperature and pressure for 264 hours. In another series of tests, sufficient 2,4-dichlorophenoxyacetic acid (referred to hereinafter as 2,4-D) was added to the base stock to give a concentrate containing 12% of the acid. Corrosion tests were likewise run on this composition. A concentrate was also prepared containing 12% of the isopropyl ester of 2,4-dichlorophenoxyacetic acid in the base stock and corrosion tests were likewise run on this material. The average penetration calculated as inches per year was determined on the portion of metals submerged in the various materials. Likewise, the penetration on the portion of the metal at the air-liquid interface was determined. The results of these tests are shown in the following table:

| Metal | Solution | Average Penetration, In./Year | Penetration at Air Liquid Interface, In./Year |
|---|---|---|---|
| Tin | Basestock | 0.0007 | 0.0175 |
| Steel | do | 0.0124 | 0.0250 |
| Tin | 12% 2,4-D in Basestock | 0.0144 | 0.0600 |
| Steel | do | 0.0183 | 0.1800 |
| Do | 12% isopropyl ester of 2,4-D in Basestock | 0.0089 | 0.2230 |

It will be noted from the above data that neither the base stock nor the concentrate containing the herbicide is extremely corrosive to the various metals. In every case, the corrosion rate at the air-liquid interface was more serious than the average corrosion rate. It was found that the base stock containing the 2,4-dichlorophenoxyacetic acid was extremely corrosive to both tin and steel if the inhibitor, cyclohexylamine sulfonate, was not present. Inhibitors such as sodium dichromate, certain arsenic compounds such as sodium arsenite, and derivatives of urea, which are normally considered to be good corrosion inhibitors for acid materials, were ineffective in inhibiting the corrosion of 2,4-dichlorophenoxyacetic acid. Such materials were particularly ineffective in inhibiting the corrosion rate on the portion of the metal contacted by the air-liquid interface. Inhibitors such as the aliphatic amines cannot be used because they are too alkaline and tend to react with acidic economic poisons. They also cause corrosion of brass and other types of containers containing copper.

In another series of corrosion tests, the concentrate containing 12% 2,4-D in the base stock was diluted with water such that only 1% of the total composition was emulsified therein. This material resulted in corrosion rates of about 0.001 to 0.004 inch per year when tested with steel, brass, zinc, and copper. These data show that the dilute solutions are not corrosive to the usual types of spray equipment that are employed for applying the economic poisons to the plants and other materials being protected.

The improved composition may be exceedingly useful in freeing navigable streams in Coastal Texas and Louisiana of infestation with plant life. For example, the numerous bayous and canals in Southern Louisiana and Texas become infested every year with growths of water hyacinths and other plant life which impede navigation to such an extent that the waterways may become impassable. These plants, as exemplified by the water hyacinth, are broad leafed plants which are coated with a waxy material which renders them difficult to treat with the usual herbicidal composition. The waxy layer causes the usual compositions to be repelled and run into the streams.

The composition of the present invention, including 2,4-dichlorophenoxyacetic acid, cyclohexylamine sulfonate, sodium sulfonates, solvent, and heavy petroleum hydrocarbons, adheres tenaciously to these leaves and allows the 2,4-dichlorophenoxyacetic acid to attack the cellular structure of the plant and thus cause its destruction. As a specific example in accordance with the present invention, a solution was prepared having the following composition:

| | Weight per cent |
|---|---|
| Isopropyl alcohol | 48.5 |
| 2,4-dichlorophenoxyacetic acid | 10.0 |
| Cyclohexylamine sulfonate | 9.5 |
| Sodium sulfonates | 7.5 |
| Petroleum oil, 75 S. S. U. vis. at 100° F | 18.5 |
| Water | 6.0 |

A portion of this composition was diluted with water to prepare a solution containing 1,000 parts per million of 2,4-dichlorophenoxyacetic acid. This solution was then applied to the leaves of the water hyacinth. The excess solution was drained off the leaves and they were then allowed to dry for a period of 30 minutes. Upon application of water to the treated leaves, only 20 per cent coverage was obtained, indicating that the oil in the composition substantially repelled the major amount of water from the leaf surface. The experiment was repeated, employing a clear watch glass which was wetted by dipping into the composition of the present invention. After dipping in the composition, the watch glass was allowed to stand so that the excess solution could drain from it, and was then dried for 30 minutes. Water was then allowed to flow over the treated surface. Again, as in the case of the treated water hyacinth leaves, only 20% of the surface was covered with water, showing that the oil and the substantially water-soluble sulfonates allowed the composition to adhere tenaciously to the treated surfaces.

Similar tests were made with original compositions containing as much as 15% of 2,4-dichlorophenoxyacetic acid with substantially the same results.

Another solution was prepared having the following composition:

| | Weight per cent |
|---|---|
| Isopropyl alcohol | 46.0 |
| 2,4-dichlorophenoxyacetic acid | 9.5 |
| Cyclohexylamine sulfonate | 9.0 |
| Sodium sulfonates | 7.1 |
| Petroleum oil, 75 S. S. U. vis. at 100° F | 17.6 |
| Petroleum aromatic extract, 3000 S. S. U. vis. at 100° F | 5.1 |
| Water | 5.7 |

This composition was diluted with water to give a solution containing about 1,000 parts per million of 2,4-D, and the solution was applied to the leaves of the water hyacinth. The presence of the viscous extract greatly improved the adhering qualities of the material as compared to the solutions containing no extract. I have found that no more than 6 to 7 percent of oil having an S. S. U. viscosity at 100° F. of above 3000 should be used in the concentrate containing the economic poison. Excessive amounts change the solubility characteristics of the other components.

Compositions made up in accordance with the present invention were diluted to form solutions containing 1000 parts per million of 2,4-dichlorophenoxyacetic acid. These solutions were then employed to spray drainage ditches which were infested with the water hyacinth. Substantially complete mortality of the water hyacinth was obtained.

In its broadest aspect, the invention contemplates one or more of the economic poisons of the type mentioned herein. For example, it may be desirable to employ, under some conditions, a herbicide in combination with a fungicide when it is desired to treat a field containing beneficial and detrimental vegetation. As an example of an instance of this sort, it may be desired to free rice, wheat, and other grain fields of detrimental growths and to treat the grain plants against attack by fungi.

It is indeed surprising that the composition of the present invention should be effective in resisting the effects of water in removing it from surfaces to which it has been applied since the sulfonate components of the composition have effective detergent and emulsifying characteristics. It is believed that the oil in combination with the sulfonates and other ingredients effectively resists, in some unexplained manner, the tendency of water to remove the dried composition from surfaces treated with the improved composition.

The nature and objects of the present invention having been completely described and illustrated, what I wish to claim as new and useful and to secure by Letters Patent is:

1. A composition effective in destroying water plants which comprises approximately 50% by weight of an aliphatic alcohol, approximately 10% by weight of 2,4-dichlorophenoxyacetic acid, approximately 10% by weight of cyclohexylamine sulfonate, approximately 10% by weight of sodium sulfonates, a petroleum oil having a Saybolt Universal viscosity at 100° F. of 75 seconds in the amount of approximately 15%, and a petroleum oil having a Saybolt Universal viscosity at 100° F. of 3000 seconds in the amount of approximately 5%.

2. An improved herbicidal composition which comprises from 10% to 90% by weight of 2,4-dichlorophenoxyacetic acid, the remainder of the composition being a vehicle for the 2,4-dichlorophenoxyacetic acid, said vehicle containing an aliphatic alcohol in an amount in the range between 40% and 95% by weight of the vehicle, cyclohexylamine sulfonate in an amount in the range between 1% and 20% by weight of the vehicle, alkali metal sulfonates in the range between 2% and 20% by weight of the vehicle, and a viscous hydrocarbon binding agent having a Saybolt Universal viscosity at 100° F. above 1,000 seconds in an amount in the range between 1% and 10% by weight of the vehicle.

ALBERT J. SHMIDL.

REFERENCES CITED

The following references are of record in the file of this patent:

UNITED STATES PATENTS

| Number | Name | Date |
|---|---|---|
| 1,969,491 | Adams | Aug. 7, 1934 |
| 2,128,973 | Tisdale et al. | Sept. 6, 1938 |
| 2,197,500 | Hockenyos | Apr. 16, 1940 |
| 2,325,359 | Arnold et al. | July 27, 1943 |
| 2,344,404 | Giloy | Mar. 14, 1944 |
| 2,402,793 | White et al. | June 25, 1946 |
| 2,430,342 | Kagy | Nov. 4, 1947 |
| 2,446,836 | King | Aug. 10, 1948 |

FOREIGN PATENTS

| Number | Country | Date |
|---|---|---|
| 369,140 | Great Britain | Mar. 17, 1932 |

OTHER REFERENCES

"The Scientific Principles of Plant Protection," Martin, 2nd ed. (1936), page 94.

Science, April 19, 1946, page 476.